Dec. 20, 1955     C. M. TUTTLE     2,727,446
RECORDING APPARATUS
Filed Jan. 12, 1953                                        2 Sheets-Sheet 1
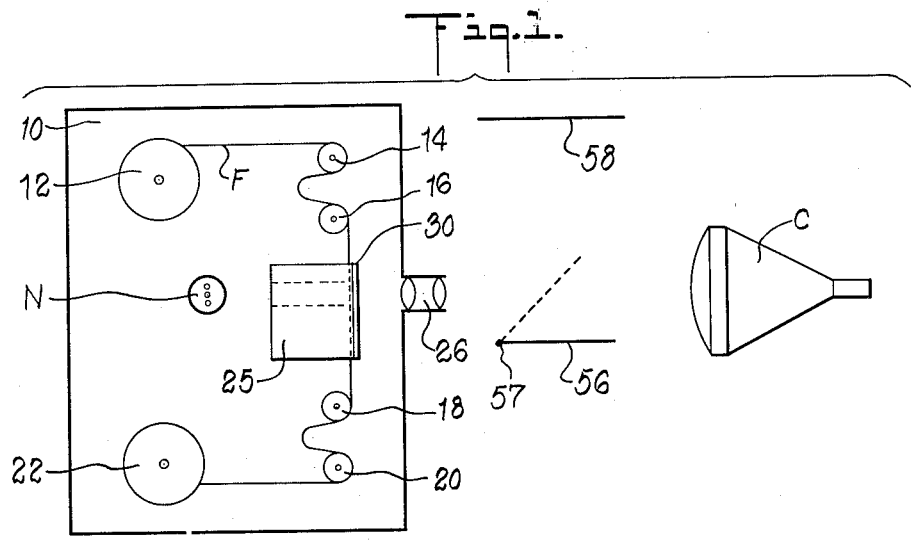
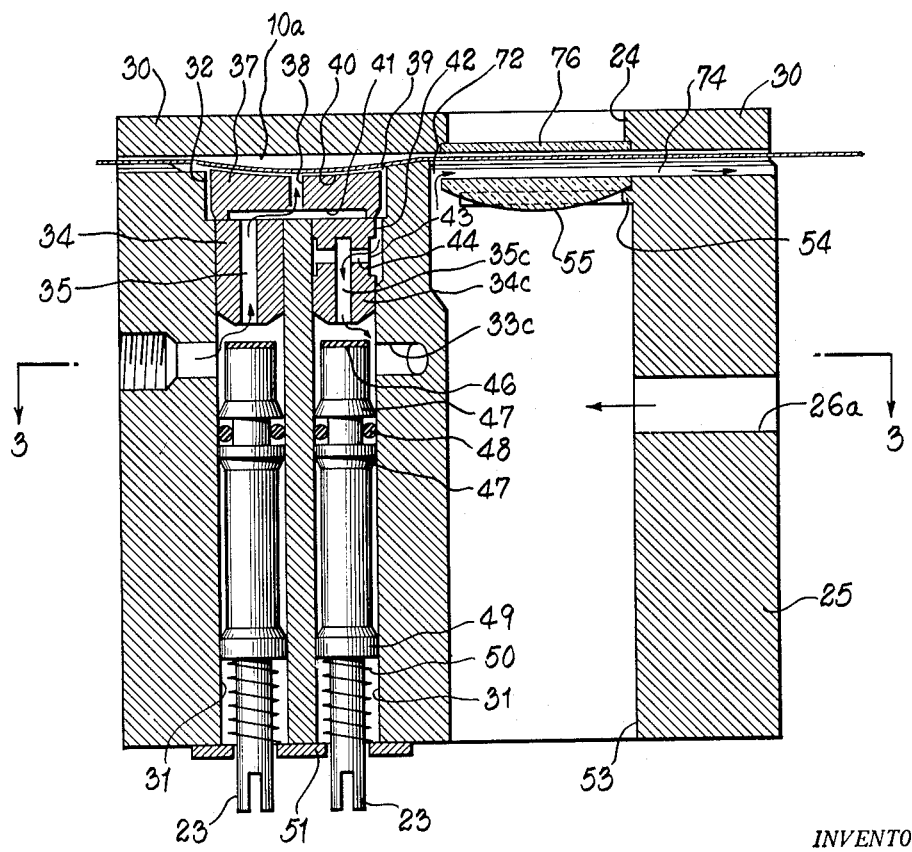
INVENTOR.
CLIFTON M. TUTTLE
BY Davis, Hoxie & Faithfull
ATTORNEYS Dec. 20, 1955  C. M. TUTTLE  2,727,446
RECORDING APPARATUS
Filed Jan. 12, 1953  2 Sheets-Sheet 2
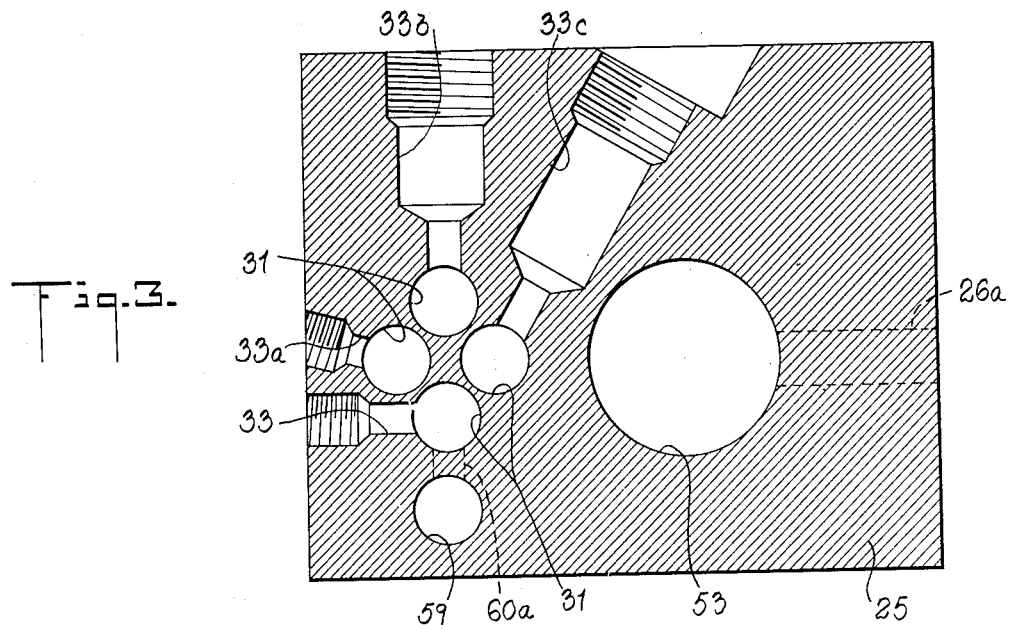
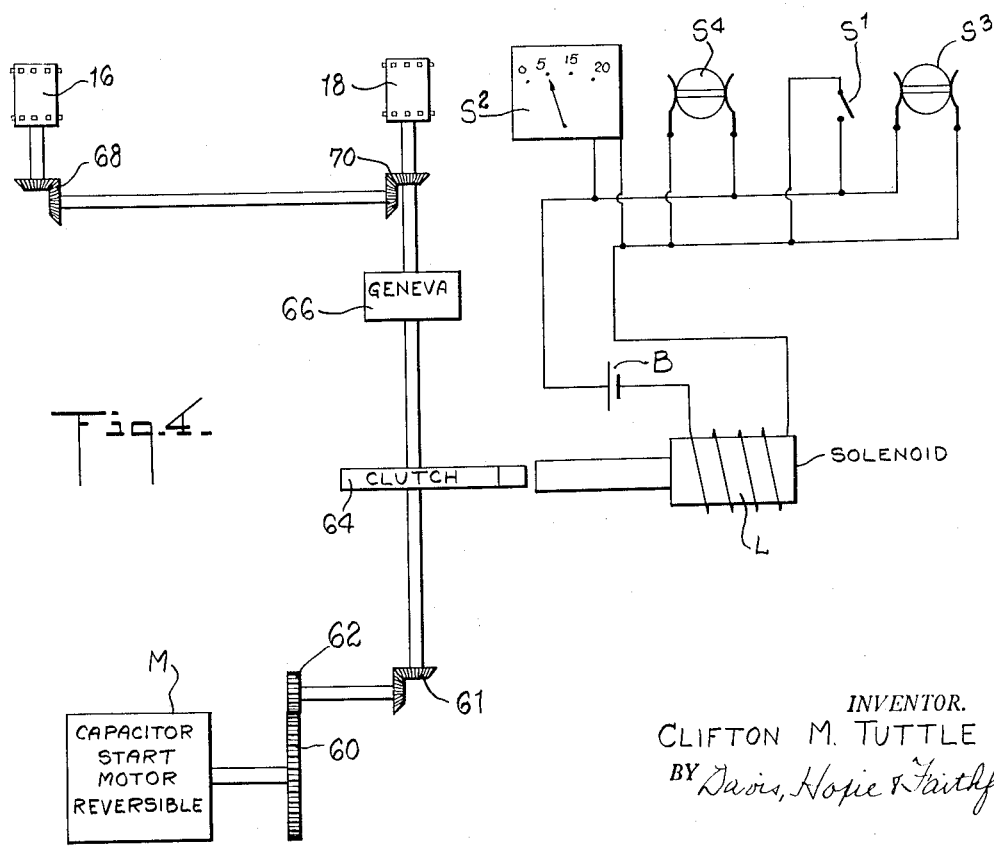
INVENTOR.
CLIFTON M. TUTTLE
BY Davis, Hoxie & Faithfull
ATTORNEYS

United States Patent Office 2,727,446
Patented Dec. 20, 1955

2,727,446

RECORDING APPARATUS

Clifton M. Tuttle, Huntington, N. Y., assignor to Kenyon Instrument Company, Inc., Huntington Station, Long Island, New York Application January 12, 1953, Serial No. 330,777

9 Claims. (Cl. 95—14)

It has become the practice to rely upon photographic records to supplement the human observation in such diverse fields as horse racing and the evaluation of scientific data. More widespread use of this valuable technique has been limited by the time required to develop the film, a process which sometimes runs into hours so that by the time the results are obtained it may be too late to base a decision thereupon.

It is therefore the objects of this invention to provide apparatus which greatly decreases the time required to expose, process and project a photographic film, which permits the film to be exposed at any desired rate, which projects the record upon each frame to be observed as soon as the frame is developed without waiting for the processing of succeeding frames, which projects the exposed film frames as a motion picture at any desired speed, which permits the start of a new series of pictures without the necessity of removing the exposed film, which permits the preselection of the number of frames to be exposed or projected, and which advances the photographic art generally.

According to the invention, the apparatus comprises guiding means forming a path along which a strip of photographic film can be moved in intermittent steps at a selected rate in either direction by reversible driving means incorporating, for example, a Geneva movement operated by a reversible motor. Adjacent the film path are located several film stations which are preferably incorporated in a processing head having a surface that forms at least a part of the path for the film. The first station includes a motion picture camera which is synchronized with the driving means so that a frame is exposed each time the action of the intermittent motion causes the film to come to rest. After the desired number of frames have been exposed at a rate determined by the selection of the driving speed, the driving means are reversed and the frames developed sequentially at a processing station which is preferably similar to the one described in my co-pending application Serial No. 114,701, filed September 9, 1949, now Patent No. 2,665,619. As each frame emerges from the processing station, it is introduced into a projecting station which is provided with a light source for imaging the record of the frame upon a screen or other surface. The projecting station is preferably located at and combined with the exposure station so that the camera lens can also function as the projection lens thereby to effect an economy in both space and cost.

These and other objects and aspects will be apparent from the following description of the presently preferred embodiment of the invention which refers to drawings wherein:

Fig. 1 is a schematic diagram of the apparatus;
Fig. 2 is a sectional view of the processing head;
Fig. 3 is a sectional view on the line 3—3 of Fig. 2; and
Fig. 4 is a simplified diagram of the driving mechanism.

The apparatus shown in Fig. 1 is particularly adapted for making a permanent photographic record of traces appearing upon the screen of a cathode ray tube C. Rotatably supported within a light-proof housing 10 is a reel 12 for holding a supply of motion picture film F. The film F passes over drive sprockets 14, 16, 18 and 20 which are operated by an intermittent movement as will be described in detail hereinafter. Upon leaving the sprocket 20, the film is wound upon a take-up reel 22. Interposed between the sprockets 16 and 18 is a processing head 25 one of whose faces forms a guide which defines a portion of the pathway along which the film F is moved.

The processing head 25 is generally similar to that described in the co-pending application Serial No. 114,701 which I filed jointly with Fordyce M. Brown on September 9, 1949, but differs therefrom in that instead of having separate exposure, processing and projection stations through which the film is sequentially fed, the exposure and projection stations of the head 25 are located at a position along the path of the film so that it is necessary to reverse the direction of movement of the film after it has passed through the exposure and processing stations in order to bring the developed film into the projection station.

The exposure station includes the conventional elements of a moving picture camera of which only a lens 26 is illustrated, the moving elements (not shown) being synchronized with the drive for the film F described below. The lens 26 focuses light rays from the traces upon the screen of the cathode ray tube C to form a latent image thereof upon the far side of the frame of unexposed film behind an aperture 24 (Fig. 2) in a film guide 30 that keeps the film F in contact with the face of the head 25.

The processing station is located in the head 25 adjacent the exposure station being disposed along the film path with respect thereto so that with one frame in register at the exposure station a previously exposed frame is positioned in the processing station. As is best shown in Figs. 2 and 3, the latter station includes four parallel bores 31 extending vertically from the bottom of the head to a central port 32 opening into the film path 10a. The bores 31 are intersected intermediate their ends by horizontal passages 33, 33a, 33b and 33c. The passages 33, 33a and 33b, together with the upper portions of their corresponding bores 31, form fluid passages for delivering a developer, a fixer and a wash liquid, respectively, to the film F at the processing station; while the passage 33c and the upper portion of the corresponding bore 31 constitutes a waste passage or port for discharging the processing fluids. The waste passage 33c is connected to a vacuum source (not shown) whereby suction is applied to the processing station. In the upper part of the bore 31 for each of the supply passages 33, 33a and 33b is an insert 34 having a relatively small passage 35 opening into the bottom of port 32. The upper part of the bore 31 for the vacuum or exhaust passage 33c also contains a hollow insert 34c which, however, is closed at its upper end, thereby blocking direct communication between the passage 35c in the latter insert and the central part of port 32. A filler block 37 is mounted in the port 32 and is provided with a central feed aperture 38 opening into the path of the film F. At its periphery, the filler block 37 defines with the surrounding wall of recess 32 an annular passage 39 concentric to the feed passage 38. The filler block 37 is held in its centered position in recess 32 in any suitable manner, as by means of radial projections (not shown) engaging the wall of recess 32. The upper face 40 of the filler block is machined to provide a concave curvature, the concave surface 40 being highly polished. In its lower part, the filler block 37 is formed with a central manifold space 41 through which communication is afforded between each supply passage 35 and the central feed passage 38 at the processing station. From the feed passage 38, the processing fluids flow radially outward between the film F and the concave surface 40 to the surrounding passage 39 and thence downward to a channel 42 adjacent the insert 34c. The latter is formed with an annular groove 43 through which the waste fluids pass from channel 42 into lateral passages 44 in the insert 34c, and thence into the central passage 35c, the corresponding bore 31, and the suction passage 33c.

Each bore 31 contains a valve element 46 located below the inserts 34—34c, the stems 23 of the valves projecting from the bottom of the processing head 25. Below the valve element 46, each valve stem is provided with spaced guide shoulders 47, and a sealing ring 48 is located in the annular space between the guide shoulders. Near the lower end of each valve stem 23 is a third guide shoulder 49 engaging the upper end of a spring 50 coiled around the stem. The lower ends of the springs 50 engage a plate 51 at the bottom of the processing head 25, whereby the springs urge the valve stems upwardly to seat the valve elements 46 against the lower ends of the inserts 34—34c, thus closing the supply passages 35 and exhaust passage 35c.

In the operation of the apparatus, the film is fed to the processing station after having been exposed at the preceding station described heretofore. At the processing station, suction is applied from vacuum passage 33c by opening the corresponding poppet valve 46 through the energizing of its solenoid 19 (not shown). The developer feed is initiated from passage 33 by opening the corresponding poppet valve 46, whereupon the developer solution flows by way of the manifold space 41 into the central feed passage 38 and thence outward along the concave surface 40 in a thin radial stream so that the emulsion side of the film is subjected throughout its previously exposed area to a thin, rapidly flowing stream. The reaction products of the developer solution are withdrawn by the suction through the annular passage 39, insert passage 35c and suction passage 33c. The suction applied to the passage 33c is carefully controlled so that the film overlying the concave surface 40 is sucked downward to assume the curvature of the surface 40, whereby the concave fluid space between the machined surface 40 and the overlying film F is of uniform thickness.

When the developing operation is completed, the valve 46 for the developer solution is closed and the control valve 46 for the fixer solution from passage 33a is opened. By reason of the close proximity of the valves 46 to the manifold 41, the fixer solution will arrive at the processing station almost immediately upon closing the developer valve and opening the fixer valve. The developer solution moves in intimate contact with the film in a rapid stream, as previously described in connection with the developer fluid, and is discharged through the common exhaust passage 33c. Upon completion of the fixing operation, the fixer valve 46 is closed and the flow of washing liquid is initiated from passage 33b by opening the corresponding valve 46, the washing liquid being likewise discharged through the vacuum passage 33c after its passage along the emulsion surface of the film. Thus, there is a continuous flow of fluids (first developer, then fixer, then washing liquid) along the film at the processing station, during which time the film is flexed by the suction from passage 33c to cause it to assume the curvature of the closely adjacent concave surface 40. When the washing operation is completed, the corresponding valve 46 is closed. Heated air is then supplied to the emulsion side of the film through the central feed passage 38, by means of a bore 59 in the head communicating with one of the supply bores 31 through a channel 60a, the supply of heated air to the bore 59 being controlled by a suitable valve (not shown). Heated air is also passed through a port 26a into the light transmitting passage 53 and then upward through channel 72 into a space between the film and the lens 55, thereby to complete the drying of the film. The air is discharged from the space between the film and the lens 55 through an exhaust channel 74 in the processing head 25. A glass film disc 76 is mounted in the projection aperture 24 above the film.

At the end of the drying operation, the suction on the film is interrupted by closing the valve 46 communicating with the vacuum passage 33c, which causes the film to assume its normal unstressed form by reason of a relatively small leakage of air from path 10a to the annular passage 39, between the film and the adjacent edge of recess 32. The film is then moved another step along the path by the mechanism described below so that the part of the film being exposed at the preceding station during the aforementioned processing operation is now moved to the processing station, where the processing cycle is repeated.

The projection station, which as mentioned above, is located at the same position along the film path as the exposure station, comprises a projection lamp N mounted adjacent one end of a light transmitting passage 53 in the head 25 whose other end terminates adjacent the nether side of the film frame in the exposure station so that light rays from the lamp are concentrated by a lens 54 disposed in the passage near the end thereof and passed through the adjacent film frame. A mirror 56 is pivoted as at 57 so that the mirror is movable into the path of the light rays from the lens 26 to direct the rays against a screen 58.

The film drive mechanism shown in Fig. 4 comprises an electric driving motor M which is reversible so that it operates a pinion 60 in either direction. The pinion 60 mates with a gear 62 which in turn drives a clutch 64 through a pair of beveled gears 61. The clutch 64 is engaged by the energization of a solenoid L, as described below, to operate a Geneva movement 66 which is a conventional lost motion device such as is ordinarily used in motion picture projectors so that the sprockets 16 and 18 that are connected to the output shaft by the bevel gears 68 and 70 make one-fourth turn for every revolution of the output shaft of the clutch.

The clutch solenoid L is energized to engage the clutch 64 from a power supply, such as the battery B, the energizing circuit being completed through any one of a plurality of switches as will be described in detail hereinafter. The first of the switches s1 is provided with normally open contacts which are manually closed to connect the battery B in series with the clutch solenoid L thereby to energize the solenoid and engage the clutch 64. As long as the clutch 64 remains engaged, the sprockets 16 and 18 operate continuously until the switch is again opened. This switch s1 provides a convenient way for indexing the film to any desired position. Connected in parallel with the manually operated switch s1 are the contacts of a pulsing switch s2 such as is available commercially as type 44 Rotary Stepping Switch made by Automatic Electric Company of Chicago, Illinois, which will sequentially close its contacts any preselected number of times thereby to cause the sprockets 16 and 18 to move a corresponding number of frames past the various stations. A commutator switch s3 which completes a circuit twice during each revolution thereof is also provided. The switch s3 is driven by a variable speed motor (not shown) to vary the rate at which the clutch solenoid is energized and therefore to vary the speed of film travel over a wide range. A second commutator switch s4 is operated in synchronism with the processing control cams (not shown) which trip switches in proper timed sequence to open and close the processing valve elements 46, as described heretofore, so that the movement of the film can be coordinated with the developing rate.

In operation, the film F is moved by the exposure station at a rate determined by the rapidity of energization of the clutch solenoid L by the operation of the commutator s3 whose rotational speed is selected by adjustment of its variable speed driving motor so that the rate of exposure can be synchronized or otherwise correlated with the occurrence of the traces on the cathode ray tube C. The processing station is inactive during the taking of the pictures so that the rate of exposure of succeeding frames is in no way dependent upon developing time. After the desired number of frames have been exposed, the motor M is reversed and the counter movement of the film F is brought under the control of the processing cams and the synchronized commutator switch s4 which closes to energize the clutch solenoid L momentarily at the end of the processing cycle for each frame as has been described in detail heretofore, to move the film F to replace the developed frame with the succeeding undeveloped frame.

If desired, the mirror 56 can be swung into position and the projection lamp N energized so that the data upon a frame can be projected upon the screen 58 and the information thereupon is made available immediately after it is developed.

As the frames of a series of pictures are developed they are rewound upon the supply roll 12 and it is possible by reversing the motor M and bringing the clutch solenoid L under the control of the commutator switch s3 to project the developed frames as motion pictures at any desired speed. Or by use of the manually operated switch s1, the film may be moved at a very rapid rate to the position wherein an unexposed frame is again in the exposure station. The pulsing switch s3 makes it possible to index any selected number of frames in either direction.

By moving the mirror 56 out of the way, the image from the frame in the projection station can be thrown upon the face of the cathode ray tube C for comparison with a new signal trace upon the tube. If the lamp N is such as to be a source of ultra violet light, the phosphor of the tube C is excited by the rays passing through the film frame thereby making it possible to compare the record with a new trace on the screen of the tube.

I claim:

1. Apparatus for the rapid exposing, processing and projecting of photographic film comprising guiding means forming a path for said film, reversible driving means for intermittently moving the film along the path in either direction, two stations positioned adjacent the film path, the first station including a camera synchronized with the driving means and having a lens for forming records upon the successive film frames presented at the station and the second station including processing means for developing the frame, means for operating said processing means at the second station only upon the reverse movement of the film whereby the rate at which the film is exposed is made independent of the period required for processing, and a light source located at said first station for imaging by means of the lens each developed film frame subsequent to the processing thereof.

2. Apparatus for the rapid exposing, processing and projecting of photographic film comprising guiding means for the film including a processing head including a surface along with the film moves, two reels positioned respectively on either side of the head, one reel holding a supply of unexposed film, the other reel being a take-up, and a driving sprocket located respectively between each reel and the head, reversible driving means for intermittently imparting a synchronized rotation to said sprockets thereby to move the film by the surface of the processing head, the processing head having two stations adjacent its guiding surface, the first station including a camera synchronized with the driving means and having a lens for forming records upon the successive film frames presented at the station, and the second station including processing means for developing the frame, means for operating said processing means at the second station only upon the reverse movement of the film whereby the rate at which the film is exposed is made independent of the period required for processing, and a light source located at said first station for imaging by means of the lens each developed film frame subsequent to the processing thereof.

3. Apparatus according to claim 2 wherein the driving means includes a Geneva movement for imparting the intermittent movement to the driving means.

4. Apparatus according to claim 3 wherein the driving means further includes a constant speed motor and a clutch interposed between the clutch and the motor.

5. Apparatus according to claim 4 wherein the clutch is operated by an electrical solenoid having an energizing circuit with a plurality of parallel connected switches.

6. Apparatus according to claim 5 wherein one of the switches is a commutator having a variable speed driving motor.

7. Apparatus according to claim 5 wherein one of the switches is synchronized with the operation of the processing station to advance the film one frame at the end of each processing cycle.

8. Apparatus for rapid exposing, processing and projecting of photographic film, comprising guide means forming a path for the film, reversible driving means for intermittently moving the film along the path in either direction, an exposure station positioned adjacent the film path for forming records upon the successive film frames presented at the station, a processing station positioned adjacent the film path and including processing means for developing each exposed frame, the processing means being operable upon reverse movement of the film whereby the rate at which the film is exposed is independent of the period required for processing, and a projection station adjacent the film path and positioned on the same side of the processing station as the exposure station, said projection station being in the same location as the exposure station and including a light source for imaging each developed film frame received from the processing station in said reverse movement of the film.

9. Apparatus according to claim 8 in which said projection station also includes a lens forming part of the exposure station and through which each developed film frame is imaged by the light source.

References Cited in the file of this patent

UNITED STATES PATENTS

| | | |
|---|---|---|
| 2,186,637 | Green | Jan. 9, 1940 |
| 2,446,668 | Tuttle | Aug. 10, 1948 |